United States Patent
Yamauchi et al.

(10) Patent No.: US 8,537,205 B2
(45) Date of Patent: Sep. 17, 2013

(54) STEREOSCOPIC VIDEO DISPLAY APPARATUS AND DISPLAY METHOD

(75) Inventors: Himio Yamauchi, Yokohama (JP); Masatoshi Sano, Fukaya (JP); Ritsuo Yoshida, Tokyo (JP); Michihiro Fukushima, Tokyo (JP); Masahiro Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 355 days.

(21) Appl. No.: 13/044,416

(22) Filed: Mar. 9, 2011

(65) Prior Publication Data

US 2012/0033054 A1 Feb. 9, 2012

(30) Foreign Application Priority Data

Aug. 6, 2010 (JP) ................... 2010-177393

(51) Int. Cl.
*H04N 13/00* (2006.01)
*H04N 15/00* (2006.01)

(52) U.S. Cl.
USPC ............................................. 348/51; 348/42

(58) Field of Classification Search
USPC ...................................... 348/42, 51
See application file for complete search history.

(56) References Cited

U.S. PATENT DOCUMENTS

| | | | |
|---|---|---|---|
| 5,602,658 A | 2/1997 | Ezra et al. | |
| 6,064,424 A | 5/2000 | van Berkel et al. | |
| 6,445,406 B1 | 9/2002 | Taniguchi et al. | |
| 7,113,231 B2 | 9/2006 | Conner et al. | |
| 7,522,161 B2 | 4/2009 | Kataoka et al. | |
| 7,932,883 B2 | 4/2011 | Klompenhouwer et al. | |
| 8,130,272 B2 | 3/2012 | Pastoor et al. | |
| 8,154,587 B2 | 4/2012 | Fukushima et al. | |
| 2004/0212933 A1 | 10/2004 | Kim | |
| 2004/0234163 A1 | 11/2004 | Lee et al. | |
| 2006/0012593 A1 | 1/2006 | Iriguchi et al. | |
| 2006/0012613 A1 | 1/2006 | Kataoka | |
| 2006/0170606 A1 | 8/2006 | Yamagajo et al. | |

(Continued)

FOREIGN PATENT DOCUMENTS

| | | |
|---|---|---|
| JP | 07005420 | 1/1995 |
| JP | 08-331604 | 12/1996 |

(Continued)

OTHER PUBLICATIONS

Japanese Patent Application No. 2010-177393; Notification of Reasons for Refusal; Mailed May 27, 2011 (English translation).

(Continued)

*Primary Examiner* — Allen Wong
(74) *Attorney, Agent, or Firm* — Blakely, Sokoloff, Taylor & Zafman LLP

(57) ABSTRACT

In one embodiment, a stereoscopic video display apparatus includes: a plane display unit including a display screen in which first to third subpixels having respectively different color components are arranged in a matrix form; and an optical plate. The plane display unit includes a configuration obtained by arranging a first subpixels and the second subpixels alternately on a first subpixel row, arranging the third subpixels on a second subpixel row adjacent to the first subpixel row, arranging the first subpixels and the second subpixels alternately on a third subpixel row adjacent to the second subpixel row to have a sequence opposite to that on the first subpixel row, arranging the third subpixels on a fourth subpixel row adjacent to the third subpixel row, and arranging a set of the first to fourth subpixel rows in the column direction of subpixels on the display screen repeatedly.

10 Claims, 7 Drawing Sheets

(56) References Cited

U.S. PATENT DOCUMENTS

| | | |
|---|---|---|
| 2006/0170616 A1 | 8/2006 | Hirayama et al. |
| 2007/0046573 A1 | 3/2007 | Kim |
| 2008/0043045 A1 | 2/2008 | Natori et al. |
| 2008/0079662 A1 | 4/2008 | Saishu et al. |
| 2009/0021534 A1 | 1/2009 | Tomizawa et al. |
| 2010/0026728 A1 | 2/2010 | Miyazaki et al. |
| 2010/0118045 A1 | 5/2010 | Brown Elliott et al. |
| 2011/0012893 A1 | 1/2011 | Iriguchi et al. |
| 2012/0120213 A1 | 5/2012 | Ohyama et al. |

FOREIGN PATENT DOCUMENTS

| | | |
|---|---|---|
| JP | 08335060 | 12/1996 |
| JP | 09-236777 | 9/1997 |
| JP | 2003248461 | 9/2003 |
| JP | 2003295114 | 10/2003 |
| JP | 2004-040722 | 2/2004 |
| JP | 2008-083600 | 4/2004 |
| JP | 2004117431 | 4/2004 |
| JP | 2005017411 | 1/2005 |
| JP | 2005-110022 | 4/2005 |
| JP | 2005331603 | 12/2005 |
| JP | 2006030512 | 2/2006 |
| JP | 2007065616 | 3/2007 |
| JP | 2004-117431 | 4/2008 |
| JP | 2008092361 | 4/2008 |
| JP | 2008083600 | 10/2008 |
| JP | 2010088087 | 4/2010 |

OTHER PUBLICATIONS

Japanese Patent Application No. 2010-177447, Notification of Reasons for Rejection, mailed May 27, 2011, (with English Translation).
Japanese Patent Application No. 2010-177461, Notification of Reasons for Rejection, mailed May 13, 2011, (with English Translation).
Japanese Patent Application No. 2010-177423, Notification of Reasons for Rejection, mailed May 27, 2011, (with English Translation).
Japanese Patent Application No. 2010-177393, Notice of Reasons for Rejection, mailed May 27, 2011, (with English Translation).
U.S. Appl. No. 13/051,844, Non-Final Office Action, mailed May 28, 2013.
U.S. Appl. No. 13/046,327, Non-Final Office Action, mailed Mar. 25, 2013.

2: SECOND PARALLAX IMAGE
4: FOURTH PARALLAX IMAGE
6: SIXTH PARALLAX IMAGE

FIG. 8

STEREOSCOPIC VIDEO DISPLAY APPARATUS AND DISPLAY METHOD

CROSS-REFERENCE TO RELATED APPLICATION

This application is based upon and claims the benefit of priority from prior Japanese Patent Application No. 2010-177393 filed on Aug. 6, 2010 in Japan, the entire contents of which are incorporated herein by reference.

FIELD

Embodiments described herein relate generally to a stereoscopic video display apparatus and a display method.

BACKGROUND

As to the stereoscopic video display apparatus, which is the so-called three-dimensional display, various schemes are known. In recent years, demands for a scheme which is for a flat panel type and which does not need dedicated glasses have increased. In stereoscopic moving picture display apparatuses of this type, there are also apparatuses which utilize the principle of the holography. However, it is difficult to put them to practical use. A scheme in which an optical plate is installed immediately before a display panel (plane display device) having fixed pixel positions, such as a direct view type or projection type liquid crystal display device or plasma display device, to control light rays supplied from the display panel and direct the light rays to a viewer is known as a scheme which can be implemented with comparative ease.

The optical plate is typically called parallax barrier as well. The optical plate controls light rays to make different images visible from different angles even in the same position on the optical plate. Specifically, in the case where only lateral disparity (horizontal disparity) is given, a slit or lenticular sheet (cylindrical lens array) is used. In the case where up-and-down disparity (vertical disparity) is also included, a pinhole array or a lens array is used. The schemes using the parallax barrier are further classified into the binocular scheme, multiview scheme, super-multiview scheme (super-multiview condition of the multiview scheme), and integral photography (hereafter referred to as IP as well). The basic principle of them is substantially the same as the principle which has been used in stereoscopic photograph invented approximately 100 years ago.

Among them, the IP scheme has a feature that the degree of freedom of the viewpoint position is high and the stereoscopic view can be obtained easily. In the IP scheme in which there is only horizontal disparity and there isn't vertical disparity, it is also possible to implement a display device having high resolution with comparative ease. On the other hand, in the binocular scheme and multiview scheme, there is a problem that the range of the viewpoint position which allows stereoscopic view, i.e., the viewing zone is narrow and it is hard to view. However, the configuration of the stereoscopic video display apparatus is the simplest, and the display image can be generated simply.

In such a direct view type autostereoscopic video display apparatus using a slit or lenticular sheet, moiré or color moiré is apt to be generated by interference between a periodic structure of optical apertures of the optical plate and a periodic structure of pixels of the plane display device. As its countermeasure, a method of inclining the direction of extension of the optical apertures obliquely is known.

However, installing the optical part of the optical plate obliquely poses a problem that the number of subpixels forming RGB for displaying an elemental image which is a set of parallax images assigned to the same optical aperture decreases, and the resolution is lowered as compared with the case where the optical apertures of the optical plate are installed vertically.

BRIEF DESCRIPTION OF THE DRAWINGS

FIG. 8 is a diagram for explaining display of a parallax image in a stereoscopic video display apparatus according to a comparative example.

DETAILED DESCRIPTION

Figure 1:
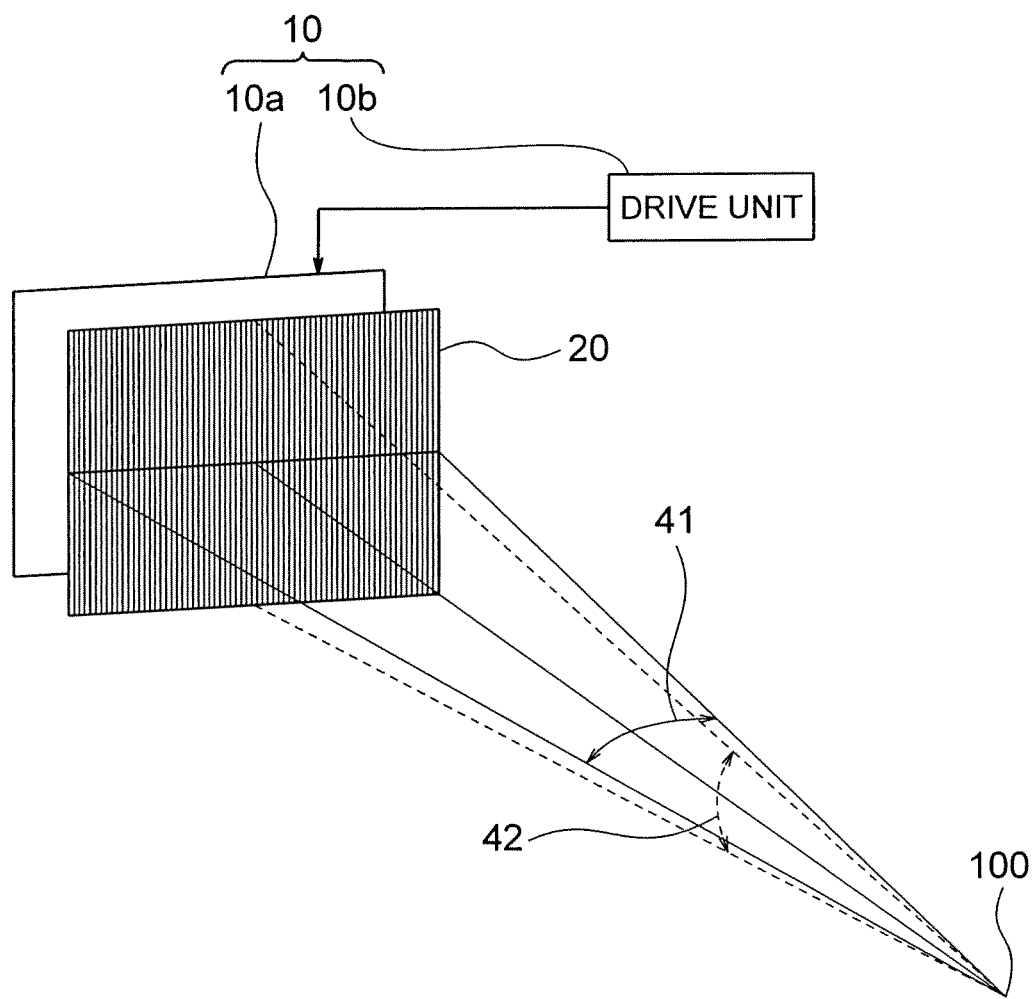
FIG. 1 is a diagram showing a configuration of a stereoscopic video display apparatus according to an embodiment.

In one embodiment, a stereoscopic video display apparatus includes: a plane display unit configured to include a display screen in which first to third subpixels having respectively different color components are arranged in a matrix form; and an optical plate configured to be disposed to be opposed to the plane display unit. The optical plate includes a plurality of optical apertures, a direction of extension of the optical apertures being inclined from a column direction of subpixels on the display screen, and light rays from the plane display unit being controlled by the optical plate. The plane display unit includes a configuration obtained by arranging a first subpixels and the second subpixels alternately on a first subpixel row, arranging the third subpixels on a second subpixel row adjacent to the first subpixel row, arranging the first subpixels and the second subpixels alternately on a third subpixel row adjacent to the second subpixel row to have a sequence opposite to that on the first subpixel row, arranging the third subpixels on a fourth subpixel row adjacent to the third subpixel row, and arranging a set of the first to fourth subpixel rows in the column direction of subpixels on the display screen repeatedly.

Hereafter, an embodiment will be described more specifically with reference to the drawings. Throughout the drawings, components having the same or similar functions are denoted by like reference numerals, and description for such components will not be repeated.

A stereoscopic video display apparatus according to an embodiment will be described with reference to the drawings. First, a typical configuration of the stereoscopic video display apparatus is shown in FIG. 1. The stereoscopic video display apparatus shown in FIG. 1 includes a plane display device 10 and an optical plate 20. The plane display device 10 includes a plane display unit (referred to as display panel as well) 10a having a display screen formed of pixels arranged in a matrix form, and a drive unit 10*b* which drives the plane display unit 10*a*. The optical plate 20 is provided in front of the plane display unit 10*a* and includes optical apertures to control light rays supplied from the pixels in the plane display unit 10*a*. It becomes possible to view a stereoscopic image in front of and behind the optical plate 20 by viewing light rays, which are emitted from the plane display unit 10*a* via the optical plate 20, from a position 100 of eyes of the viewer. By the way, the optical aperture is a physical aperture in the case where the optical plate is a slit, whereas the optical aperture is each cylindrical lens in the case where the optical plate is a lenticular sheet. In this case, there is parallax only in a horizontal direction 41 and an image changes as the viewing distance changes. However, since there is no parallax in a vertical direction 42, a constant video is perceived regardless of the viewing position. In some cases, a spacer is provided between the plane display unit 10*a* and the optical plate 20 to adjust a focal length.

As long as pixels having determined positions in the display screen are arranged in a planar matrix form, the plane display unit 10*a* may be a display panel of a direct view type or projection type liquid crystal display device, a plasma display device, an electric field emission type display device, or an organic EL display device. The drive unit 10*b* sends display data to the plane display unit 10*a*, assigns the display data to the pixels in the plane display unit 10*a*, and drives the stereoscopic video display apparatus to display a stereoscopic video. The drive unit 10*b* may be integral with the plane display unit 10*a*, or may be provided outside the plane display unit 10*a*.

Figure 2:
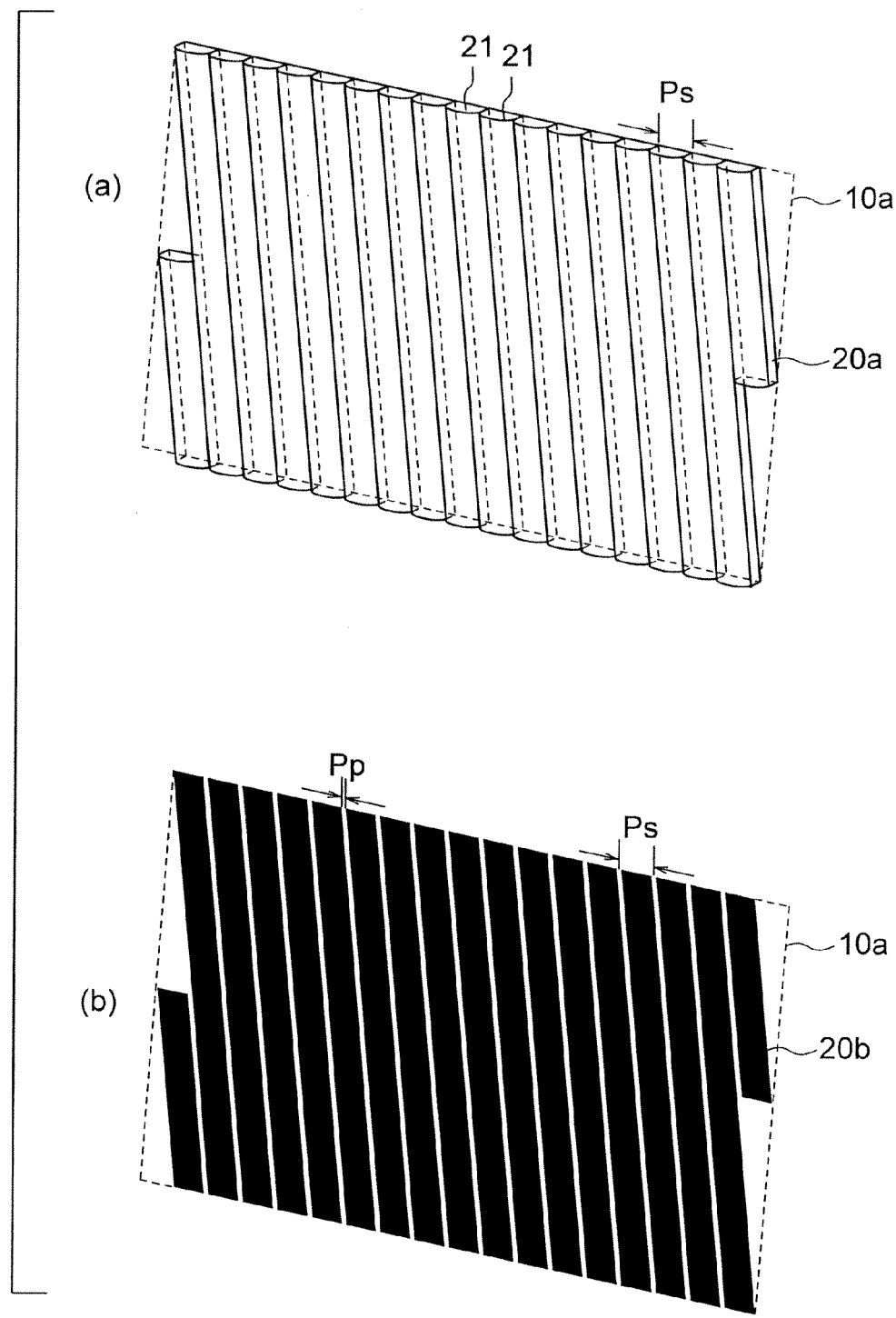
FIGS. 2(a) and 2(b) are diagrams showing an optical plate used in a stereoscopic video display apparatus according to an embodiment.
Figure 3:
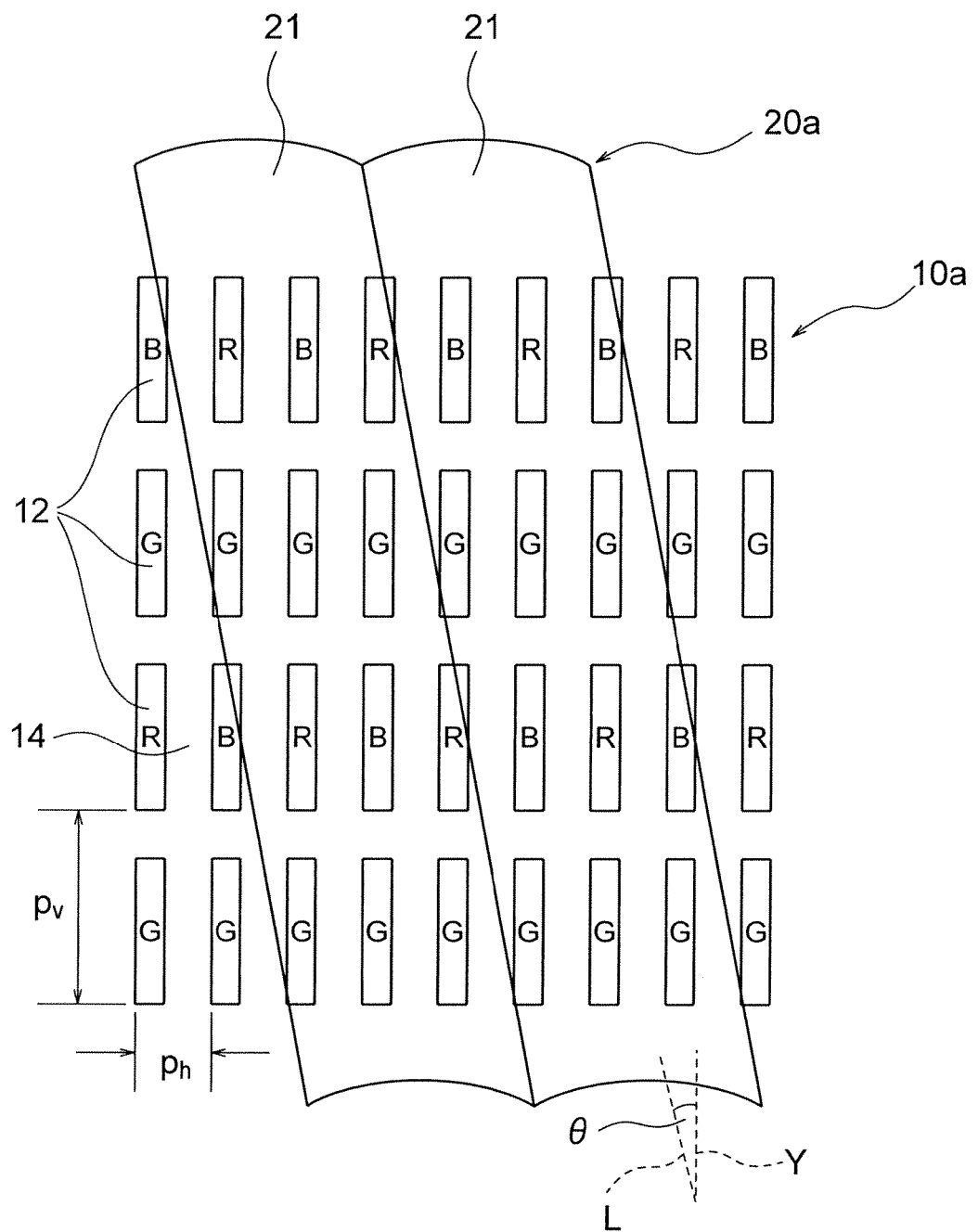
FIG. 3 is a diagram for explaining that an optical plate is inclined from a column direction of subpixels.

Furthermore, in the configuration of the stereoscopic video display apparatus according to the present embodiment, the extension direction of the optical apertures of the optical plate 20 is inclined obliquely from the longitudinal direction (vertical direction) of the display screen in the plane display unit 10*a*. For example, a perspective view in the case where the optical plate 20 is a lenticular sheet 20*a* formed of a plurality of cylindrical lenses 21 is shown in FIG. 2(*a*), and a perspective view in the case where the optical plate 20 is a slit 20*b* is shown in FIG. 2(*b*). In FIGS. 2(*a*) and 2(*b*), Ps denotes a pitch of the optical apertures in the optical plate 20. In FIG. 2(*b*), Pp denotes a size of an aperture in the slit.

In the stereoscopic video display apparatus according to the present embodiment, the display screen of the plane display unit 10*a* has R (red), G (green) and B (blue) subpixels arranged in an array form. By the way, the R (red), G (green) and B (blue) subpixels are implemented by arranging color filters on the display screen suitably. In the present embodiment, the direction of extension of the optical apertures in the optical plate 20, i.e., the long axis direction of the cylindrical lenses 21 in the lenticular sheet 20*a* is inclined obliquely from the longitudinal direction (vertical direction) of the display screen in the plane display unit 10*a*, and consequently the direction is inclined from the column direction of subpixels by a predetermined angle θ (≠0). In the present embodiment, each subpixel includes an aperture 12 and a black matrix 14. Therefore, the subpixels are arranged in the longitudinal direction and the lateral direction to be adjacent to each other. Each subpixel has a longitudinal to lateral size ratio of 3:1. In other words, denoting a pitch of subpixels in the lateral direction (horizontal direction) by $p_h$ and denoting a pitch of subpixels in the longitudinal direction (vertical direction) by $p_v$, the relation $p_h/p_v=1/3$ is satisfied. When an inclination angle θ of the optical plate 20 is represented as $θ=\arctan^{-1}(1/n)$, it is desirable in the present embodiment that n is a natural number of at least 2. The present embodiment has a configuration that B subpixels and R subpixels are disposed above and below G subpixels located at the center. Therefore, it is more desirable that the relation n=2 is satisfied.

Figure 4:
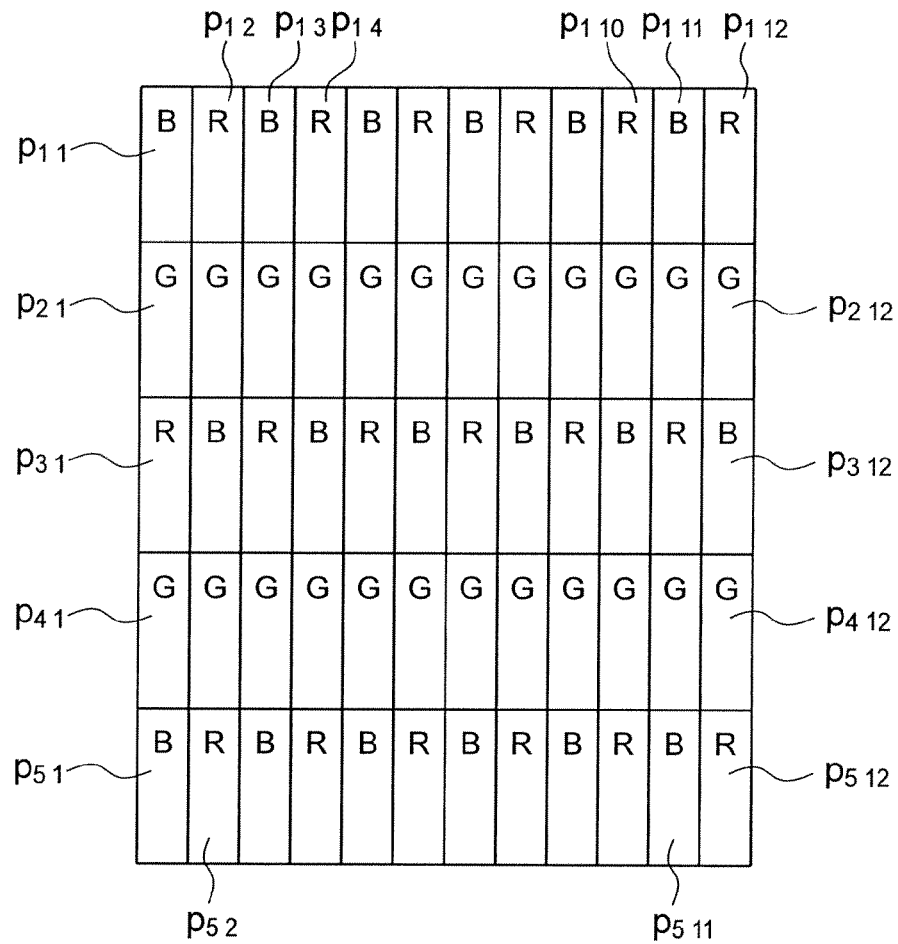
FIG. 4 is a diagram showing an arrangement of R, G and B subpixels in a stereoscopic video display apparatus according to an embodiment.

An arrangement of the R, G and B subpixels in the present embodiment is shown in FIG. 4. As shown in FIG. 4, B subpixels and R subpixels are arranged alternately in a first subpixel row. G subpixels are arranged in a second subpixel row. B subpixels and R subpixels are arranged alternately in a third subpixel row to have an order opposite to that in the arrangement in the first subpixel row. G subpixels are arranged in a fourth subpixel row. A set of the first to fourth subpixel rows is arranged in the vertical direction of the display screen (the column direction of subpixels) repeatedly. By the way, it is desirable that only G subpixels are arranged in the second and fourth subpixel rows. In the present embodiment, a final subpixel row is provided next to a final set. In the final subpixel row, B subpixels and R subpixels are arranged alternately to have an order opposite to that in the third subpixel row in the final set.

For example, as shown in FIG. 4, the arrangement of subpixels is represented by $p_{i,j}$ (i=1, . . . , 5, j=1, . . . , 12). In other words, $p_{i,j(i}=1, \ldots, 5, j=1, \ldots, 12)$ represents a subpixel in an i-th subpixel row and a j-th subpixel column. In the present embodiment, a subpixel $p_{1\,2k-1}$ (k=1, . . . , 6) in a first subpixel row is a B subpixel, and a subpixel $p_{1\,2k-1}$ (k=1, . . . , 6) in the first subpixel row is an R subpixel. A subpixel $p_{2,j}$ (j=1, . . . , 12) in a second subpixel row and a subpixel $p_{4,j}$ (j=1, . . . , 12) in a fourth subpixel row are G subpixels. In a third subpixel row, a subpixel $p_{3\,2k-1}$ (k=1, . . . , 6) is an R subpixel, and a subpixel $p_{3\,2k}$ (k=1, . . . , 6) is a B subpixel. A set of the first to fourth subpixel rows is arranged in the vertical direction of the display screen repeatedly. By the way, only one set of the first to fourth subpixel rows is shown in FIG. 4. And in the present embodiment, a final subpixel row is provided next to a final set. In the final subpixel row, B subpixels and R subpixels are arranged alternately to have an order opposite to that in the third subpixel row in the final set.

Figure 5:
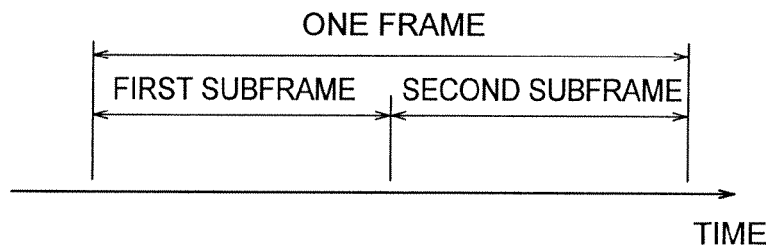
FIG. 5 is a diagram for explaining one frame in a stereoscopic video display apparatus according to an embodiment.

In general, in the stereoscopic video display apparatus, an elemental image which is a set of parallax images assigned to the same aperture of the optical plate includes numbered parallax images. Therefore, in the present embodiment, as shown in FIG. 5, one frame of a displayed video is divided into a first subframe and a second subframe, and, for example, odd-numbered parallax images are displayed in the first subframe whereas even-numbered parallax images are displayed in the second subframe. Control of such display is performed by the drive unit 10*b*.

Figure 6:
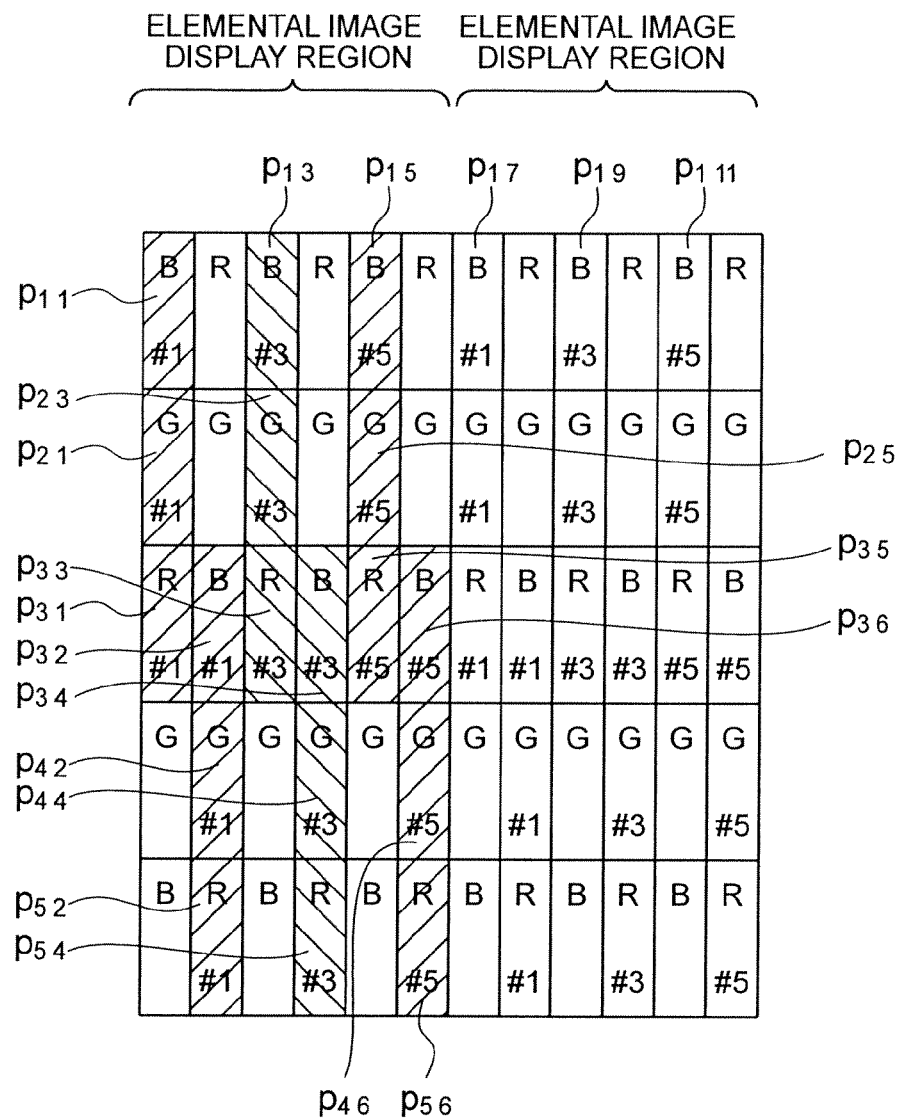
FIG. 6 is a diagram for explaining display of an odd-numbered parallax image in a stereoscopic video display apparatus according to an embodiment.
Figure 7:
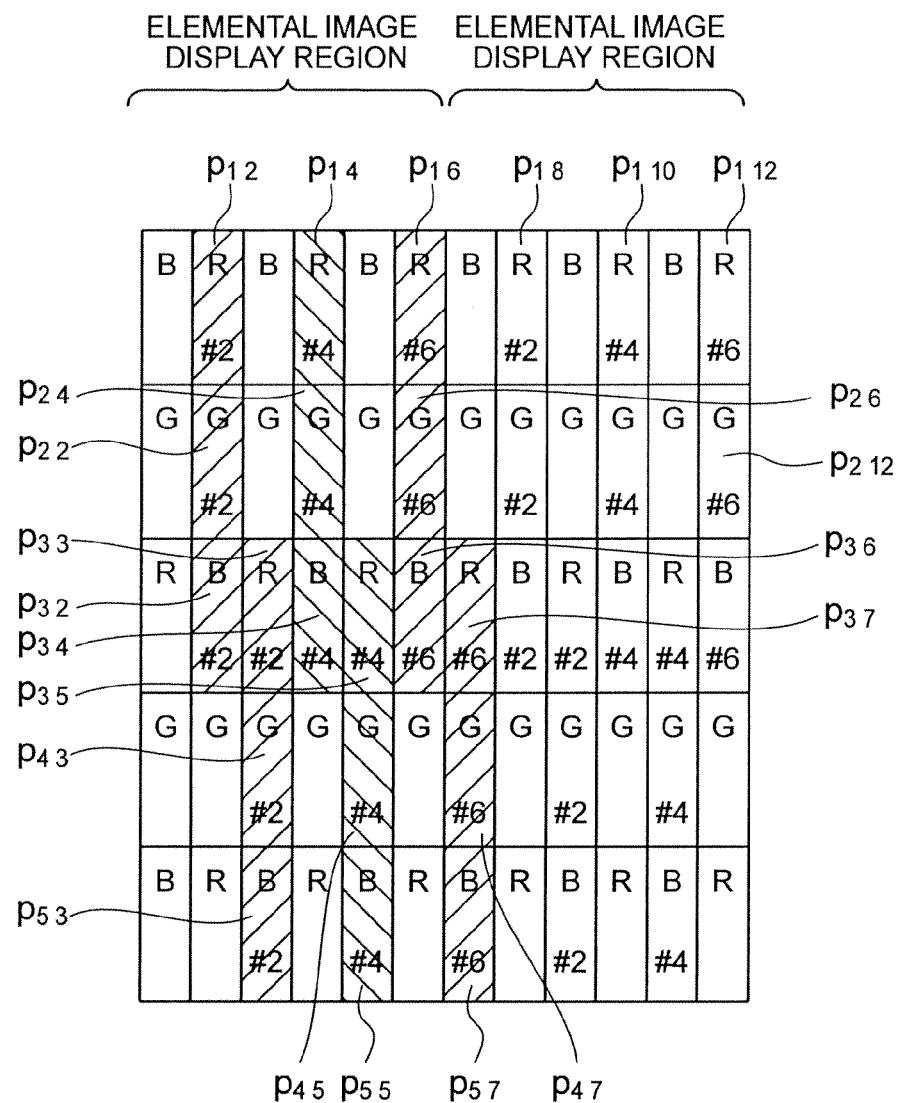
FIG. 7 is a diagram for explaining display of an even-numbered parallax image in a stereoscopic video display apparatus according to an embodiment.

Such divisional display in two subframes will now be described as to the case where the elemental image is formed of six parallax images with reference to FIG. 6 and FIG. 7. FIG. 6 shows a display example of parallax images in the case where odd-numbered parallax images are displayed in the first subframe. FIG. 7 shows a display example of parallax images in the case where even-numbered parallax images are displayed in the second subframe.

As shown in FIG. 6, a first parallax image (denoted by #1) of one elemental image (for example, a first elemental image) is displayed by using subpixels $p_{1\,1}, p_{2\,1}, p_{3\,1}, p_{3\,2}, p_{4\,2}$ and $p_{5\,2}$. A third parallax image (denoted by #3) is displayed by using subpixels $p_{1\,3}, p_{2\,3}, p_{3\,3}, p_{3\,4}, p_{4\,4}$ and $p_{5\,4}$. A fifth parallax image (denoted by #5) is displayed by using subpixels $p_{1\,5}, p_{2\,5}, p_{3\,5}, p_{3\,6}, p_{4\,6}$ and $p_{5\,6}$. The subpixels $p_{1\,1}, p_{2\,1}, p_{3\,1}, p_{3\,2}, p_{4\,2}$ and $p_{5\,2}$ are B, G, R, B, G and R subpixels, respectively. The subpixels $p_{1\,3}, p_{2\,3}, p_{3\,3}, p_{3\,4}, p_{4\,4}$ and $p_{5\,4}$ are B, G, R, B, G and R subpixels, respectively. The subpixels $p_{1\,5}, p_{2\,5}, p_{3\,5}, p_{3\,6}, p_{4\,6}$ and $p_{5\,6}$ are B, R, B, G and R subpixels, respectively. By the way, in FIG. 6, subpixels which display odd-numbered parallax images in the first elemental image are shaded.

By the way, the subpixels $p_{1\ 7}$, $p_{2\ 7}$, $p_{3\ 7}$, $p_{3\ 8}$, $p_{4\ 8}$ and $p_{5\ 8}$ display a first parallax image of a second elemental image corresponding to an optical aperture which is adjacent in a rightward direction to an optical aperture of the optical plate 20 corresponding to the first elemental image. A set of subpixels displaying one elemental image is referred to as elemental image display region. In other words, the elemental image display region includes subpixels which display odd-numbered parallax images and subpixels which display even-numbered parallax images. In the present embodiment, the optical plate 20 is inclined obliquely from the longitudinal direction of the display screen in the plane display unit 10a (the column direction of subpixels). Therefore, the elemental image display regions are also inclined from the longitudinal direction of the display screen with the same inclination angle.

In FIG. 6, a set of subpixels $p_{1\ 1}$, $p_{2\ 1}$ and $p_{3\ 1}$ displaying a first parallax image in the first elemental image represents one pixel (for example, a first pixel) formed of B, G and R subpixels. A set of subpixels $p_{3\ 2}$, $p_{4\ 2}$ and $p_{5\ 2}$ displaying the first parallax image represents one pixel (for example, a second pixel) formed of B, G and R subpixels which is adjacent to the first pixel in the vertical downward direction when displaying the same parallax image. In other words, the first pixel and the second pixel are pixels which are adjacent to each other in the vertical direction when displaying the first parallax image.

In this way, in an odd-numbered parallax image, a G subpixel, a B subpixel which is located above and adjacent to the G subpixel, and an R subpixel which is located below and adjacent to the G subpixel constitute one pixel which displays one parallax image as shown in FIG. 6. In other words, three subpixels arranged having the G subpixel at the center and other two subpixels respectively located above and below the G subpixel to be adjacent to the G subpixel constitute one pixel which displays one parallax image. In each elemental image, one pixel (for example, the first pixel) which displays one parallax image and the other pixel (for example, the second pixel) which displays the same parallax image and which is adjacent to the one pixel in the vertical downward direction have a configuration that an R subpixel (for example, the subpixel $p_{3\ 1}$) which is a third subpixel in the vertical direction of the one pixel and a B subpixel (for example, the subpixel $p_{3\ 2}$) which is a first subpixel in the vertical direction of the other pixel are adjacent to each other in the horizontal direction. In addition, in each elemental image, a pixel (for example, a pixel formed of the subpixels $p_{1\ 1}$, $p_{2\ 1}$ and $p_{3\ 1}$) located at the top in the vertical direction as an odd-numbered parallax image is disposed in the first to third subpixel rows in the odd-numbered subpixel column in the elemental image display region. Such assignment of parallax images to elemental image display regions is conducted by causing the drive unit 10b to drive the plane display unit 10a.

In FIG. 6, a first row of a first subframe is formed by the subpixels $p_{1\ 1}$, $p_{2\ 1}$ and $p_{3\ 1}$ which display a part of the first parallax image in the first elemental image, the subpixels $p_{1\ 3}$, $p_{2\ 3}$ and $p_{3\ 3}$ which display a part of the third parallax image in the first elemental image, the subpixels $p_{1\ 5}$, $p_{2\ 5}$ and $p_{3\ 5}$ which display a part of the fifth parallax image in the first elemental image, the subpixels $p_{1\ 7}$, $p_{2\ 7}$ and $p_{3\ 7}$ which display a part of the first parallax image in the second elemental image, subpixels $p_{1\ 9}$, $p_{2\ 9}$ and $p_{3\ 9}$ which display a part of a third parallax image in the second elemental image, and subpixels $p_{1\ 11}$, $p_{2\ 11}$ and $p_{3\ 11}$ which display a part of a fifth parallax image in the second elemental image.

Furthermore, a second row of the first subframe is formed of the subpixels $p_{3\ 2}$, $p_{4\ 2}$ and $p_{5\ 2}$ which display a part of the first parallax image in the first elemental image, the subpixels $p_{3\ 4}$, $p_{4\ 4}$ and $p_{5\ 4}$ which display a part of the third parallax image in the first elemental image, the subpixels $p_{3\ 6}$, $p_{4\ 6}$ and $p_{5\ 6}$ which display a part of the fifth parallax image in the first elemental image, the subpixels $p_{3\ 8}$, $p_{4\ 8}$ and $p_{5\ 8}$ which display a part of the first parallax image in the second elemental image, subpixels $p_{3\ 10}$, $p_{4\ 10}$ and $p_{5\ 10}$ which display a part of the third parallax image in the second elemental image, and subpixels $p_{3\ 12}$, $p_{4\ 12}$ and $p_{5\ 12}$ which display a part of the fifth parallax image in the second elemental image. In other words, each of rows in the first subframe is formed of three subpixel rows, and adjacent rows share one subpixel row.

As shown in FIG. 7, a second parallax image (denoted by #2) of the first elemental image is displayed by using subpixels $p_{1\ 2}$, $p_{2\ 2}$, $p_{3\ 2}$, $p_{3\ 3}$, $p_{4\ 3}$ and $p_{5\ 3}$. A fourth parallax image (denoted by #4) is displayed by using subpixels $p_{1\ 4}$, $p_{2\ 4}$, $p_{3\ 4}$, $p_{3\ 5}$, $p_{4\ 5}$ and $p_{5\ 5}$. A sixth parallax image (denoted by #6) is displayed by using subpixels $p_{1\ 6}$, $p_{2\ 6}$, $p_{3\ 6}$, $p_{3\ 7}$, $p_{4\ 7}$ and $p_{5\ 7}$. The subpixels $p_{1\ 2}$, $p_{2\ 2}$, $p_{3\ 2}$, $p_{3\ 3}$, $p_{4\ 3}$ and $p_{5\ 3}$ are R, G, B, R, G and B subpixels, respectively. The subpixels $p_{1\ 4}$, $p_{2\ 4}$, $p_{3\ 4}$, $p_{3\ 5}$, $p_{4\ 5}$ and $p_{5\ 5}$ are R, G, B, R, G and B subpixels, respectively. The subpixels $p_{1\ 6}$, $p_{2\ 6}$, $p_{3\ 6}$, $p_{3\ 7}$, $p_{4\ 7}$ and $p_{5\ 7}$ are R, G, B, R, G and B subpixels, respectively. Subpixels which display even-numbered parallax images in the first elemental image are shaded.

By the way, the subpixels $p_{1\ 8}$, $p_{2\ 8}$, $p_{3\ 8}$, $p_{3\ 9}$, $p_{4\ 9}$ and $p_{5\ 9}$ display a second parallax image of a second elemental image corresponding to an optical aperture which is adjacent in a rightward direction to an optical aperture of the optical plate 20 corresponding to the first elemental image.

In FIG. 7, a set of subpixels $p_{1\ 2}$, $p_{2\ 2}$ and $p_{3\ 2}$ displaying a second parallax image in the first elemental image represents one pixel (for example, a first pixel) formed of R, G and B subpixels. A set of subpixels $p_{3\ 3}$, $p_{4\ 3}$ and $p_{5\ 3}$ displaying the fourth parallax image represents one pixel (for example, a second pixel) formed of R, G and B subpixels which is adjacent to the first pixel in the vertical downward direction when displaying the same parallax image. In other words, the first pixel and the second pixel are pixels which are adjacent to each other in the vertical direction when displaying the second parallax image.

In this way, in an even-numbered parallax image, a G subpixel, an R subpixel which is located above and adjacent to the G subpixel, and a B subpixel which is located below and adjacent to the G subpixel constitute one pixel which displays one parallax image as shown in FIG. 7. In other words, three subpixels arranged having the G subpixel at the center and other two subpixels respectively located above and below the G subpixel to be adjacent to the G subpixel constitute one pixel which displays one parallax image. In each elemental image, one pixel (for example, the first pixel) which displays one parallax image and the other pixel (for example, the second pixel) which displays the same parallax image and which is adjacent to the one pixel in the vertical downward direction have a configuration that a B subpixel (for example, the subpixel $p_{3\ 2}$) which is a third subpixel in the vertical direction of the one pixel and an R subpixel (for example, the subpixel $p_{3\ 3}$) which is a first subpixel in the vertical direction of the other pixel are adjacent to each other in the horizontal direction. In addition, in each elemental image, a pixel (for example, a pixel formed of the subpixels $p_{1\ 2}$, $p_{2\ 2}$ and $p_{3\ 2}$) for displaying an image located at the top in the vertical direction as an even-numbered parallax image is disposed in the first to third subpixel rows in the even-numbered subpixel column in the elemental image display region. Such assignment of parallax images to elemental image display regions is conducted by causing the drive unit 10b to drive the plane display unit 10a.

In FIG. 7, a first row of a second subframe is formed of the subpixels $p_{1\ 2}$, $p_{2\ 2}$ and $p_{3\ 2}$ which display a part of the second parallax image in the first elemental image, the subpixels $p_{1\ 4}$, $p_{2\ 4}$ and $p_{3\ 4}$ which display a part of the fourth parallax image in the first elemental image, the subpixels $p_{1\ 6}$, $p_{2\ 6}$ and $p_{3\ 6}$ which display a part of the sixth parallax image in the first elemental image, the subpixels $p_{1\ 8}$, $p_{2\ 8}$ and $p_{3\ 8}$ which display a part of the second parallax image in the second elemental image, subpixels $p_{1\ 10}$, $p_{2\ 10}$ and $p_{3\ 10}$ which display a part of a fourth parallax image in the second elemental image, and subpixels $p_{1\ 12}$, $p_{2\ 12}$ and $p_{3\ 12}$ which display a part of a sixth parallax image in the second elemental image.

Furthermore, a second row of the second subframe is formed of the subpixels $p_{3\ 3}$, $p_{4\ 3}$ and $p_{5\ 3}$ which display a part of the second parallax image in the first elemental image, the subpixels $p_{3\ 5}$, $p_{4\ 5}$ and $p_{5\ 5}$ which display a part of the fourth parallax image in the first elemental image, the subpixels $p_{3\ 7}$, $p_{4\ 7}$ and $p_{5\ 7}$ which display a part of the sixth parallax image in the first elemental image, the subpixels $p_{3\ 9}$, $p_{4\ 9}$ and $p_{5\ 9}$ which display a part of the second parallax image in the second elemental image, subpixels $p_{3\ 11}$, $p_{4\ 11}$ and $p_{5\ 11}$ which display a part of the fourth parallax image in the second elemental image, and subpixels (not illustrated) which display a part of the sixth parallax image in the second elemental image. In other words, each of rows in the second subframe is formed of three subpixel rows, and adjacent rows share one subpixel row.

In the present embodiment having such a configuration, the number of subpixels displaying the same parallax image is represented by 2N+1, where N denotes the number of rows in each subframe. This is because adjacent rows in each subframe share one subpixel row and each row has one subpixel row which displays G (green).

Figure 8:
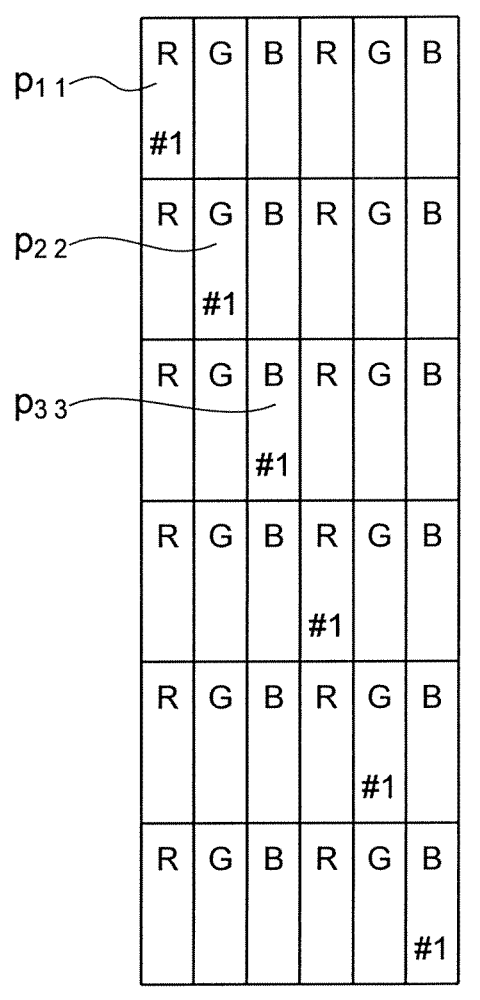

On the other hand, FIG. 8 shows a comparative example in which R, G and B subpixels are arranged in a longitudinal stripe form. A stereoscopic video display apparatus according to the comparative example also has a configuration in which the direction of extension of the optical apertures of the optical plate is inclined from the longitudinal direction of the display screen of the plane display unit in the same way as the embodiment of the present invention. In this comparative example, the number of subpixels which display the same parallax image is represented by 3N, where the number of rows in each frame is denoted by N. This is because, in the case of the longitudinal stripe arrangement shown in FIG. 8, the same parallax image (for example, a parallax image of #1) is displayed by subpixels in the oblique direction; R, G and B subpixels (for example, $p_{11}$, $p_{22}$ and $p_{33}$) in the oblique direction constitute one pixel; and each row in each frame corresponds to three subpixel rows. By the way, the comparative example in which R, G and B subpixels are arranged in the longitudinal stripe form is used frequently in the conventional stereoscopic video display apparatus.

As will be understood from the foregoing description, when displaying the same parallax image according to the present embodiment, it is possible to display it with subpixels which are less in number than those in the comparative example. This means that a larger number of parallax images can be displayed with a smaller number of subpixels. As a result, the resolution can be increased.

Remarking only G subpixels in the case where odd-numbered parallax images are displayed as shown in FIG. 6 in the present embodiment, G subpixels in the display state and G subpixels in the non-display state appear alternately in the subpixel row direction, whereas G subpixels in the display state and G subpixels in the non-display state appear alternately in the subpixel column direction with one subpixel row (a row displaying R and B) in between. In other words, a checkered pattern is formed. A similar pattern also appears in the case where even-numbered parallax images are displayed as shown in FIG. 7. As compared with the case where odd-numbered parallax images are displayed as shown in FIG. 6, however, positions of the display state and the non-display state in the checkered pattern are opposite.

And an R subpixel (for example, $p_{3\ 3}$) on an odd-numbered row in the first subframe is used as an R subpixel on an even-numbered row adjacent to the odd-numbered row when a parallax image having a number adjacent to a number of a parallax image displayed by the R subpixel is displayed in the second subframe. Furthermore, a B subpixel (for example, $p_{3\ 2}$) on an odd-numbered row in the second subframe is used as a B subpixel on an even-numbered row adjacent to the odd-numbered row when a parallax image having a number adjacent to a number of a parallax image displayed by the B subpixel is displayed in the first subframe.

An R subpixel (for example, the subpixel $p_{3\ 2}$) which displays an odd-numbered parallax image is also used as an R subpixel which displays a parallax image having an even number adjacent to the odd number.

A B subpixel (for example, the subpixel $p_{3\ 2}$) which displays an odd-numbered parallax image is also used as a B subpixel which displays a parallax image having an even number adjacent to the odd number.

In the foregoing description, an odd-numbered parallax image is displayed in the first subframe and an even-numbered parallax image is displayed in the second subframe. Alternatively, however, it is also possible to display an even-numbered parallax image in the first subframe and display an odd-numbered parallax image in the second subframe.

It is also possible to display parallax images of a first group from among a plurality of parallax images in one of the first and second subframes and display parallax images of a remaining second group from among the plurality of parallax images in the other of the first and second subframes.

Furthermore, as a first modification of the present embodiment, a stereoscopic video display apparatus may have an arrangement in which G subpixels are interchanged with R subpixels.

As a second modification of the present embodiment, a stereoscopic video display apparatus may have an arrangement in which G subpixels are interchanged with B subpixels.

By the way, since G (green) becomes dominant on the luminance component as compared with R (red) or B (blue), the stereoscopic video display apparatus according to the present embodiment is more desirable than the first modification and the second modification.

The embodiment is nothing but an example, and the scope of the invention is not restricted thereby.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A stereoscopic video display apparatus to display a stereoscopic video with a plurality of parallax images including a first and second parallax images, the apparatus comprising:
 a plane display module configured to include a display screen in which first to third subpixels having respectively different color components are arranged in a matrix form;
 an optical plate configured to be disposed to be opposed to the plane display module, the optical plate including a plurality of optical apertures, a direction of extension of the optical apertures being inclined from a column direction of subpixels on the display screen, and light rays from the plane display module being controlled by the optical plate;
 a drive module which sends data to the plane display module, assigns the data to the first to third subpixels in the plane display module, and drives the plane display module to display a stereoscopic video, wherein
 the plane display module includes a configuration obtained by arranging a first subpixels and the second subpixels alternately on a first subpixel row, arranging the third subpixels on a second subpixel row adjacent to the first subpixel row, arranging the first subpixels and the second subpixels alternately on a third subpixel row adjacent to the second subpixel row to have a sequence opposite to that on the first subpixel row, arranging the third subpixels on a fourth subpixel row adjacent to the third subpixel row, and arranging a set of the first to fourth subpixel rows in the column direction of subpixels on the display screen repeatedly;
 the drive module assigns an elemental image including the plurality of parallax images to each optical aperture and assigns an elemental image display region in the plane display module to each elemental image;
 the drive module selects three subpixels which are the first to third subpixels arranged consecutively in the column direction of subpixels with the third subpixel located in the center, as a pixel displaying each parallax image;
 the drive module assigns first and second pixels which are adjacent in the column direction and display the first parallax image in each elemental image so as to cause a third subpixel from top of the first pixel and a first subpixel from top of the second pixel to be adjacent to each other in a same subpixel row;
 the drive module assigns third and fourth pixels which are adjacent in the column direction and display the second parallax image in each elemental image so as to be adjacent to the first and second pixels in a row direction respectively;
 the drive module causes the second pixel in the first parallax image and the third pixel in the second parallax image adjacent to a subpixel column direction of the second pixel to share one subpixel; and
 the drive module divides each of frames displaying a stereoscopic video into two subframes, displays parallax images of a first group from among a plurality of parallax images on one of the two subframes, and displays parallax images of a remaining second group from among the plurality of parallax images on the other of the two subframes, the parallax images of the first group including the first parallax image and the parallax images of the second group including the second parallax image.

2. The stereoscopic video display apparatus according to claim 1, wherein the plane display module further includes a configuration obtained by arranging the first subpixels and the second subpixels alternately on a subpixel row next to a final set in the repeatedly arranged sets, to have a sequence opposite to that in the arrangement of the third subpixel row in the final set.

3. The stereoscopic video display apparatus according to claim 1, wherein:
 when displaying the one subframe, the third subpixels in a display state and the third subpixels in a non-display state appear alternately in a subpixel row direction, whereas the third subpixels in the display state and the third subpixels in the non-display state appear alternately in the subpixel column direction with one subpixel row in between;
 when displaying the other subframe, the third subpixels in the display state and the third subpixels in the non-display state appear alternately in the subpixel row direction, whereas the third subpixels in the display state and the third subpixels in the non-display state appear alternately in the subpixel column direction with one subpixel row in between, positions of the display state and the non-display state concerning the third subpixel in the other subframe being opposite to those in the one subframe;
 the first subpixel which displays an odd-numbered parallax image is also used as the first subpixel which displays a parallax image having an even number adjacent to the odd number; and
 the second subpixel which displays an odd-numbered parallax image is also used as the second subpixel which displays a parallax image having an even number adjacent to the odd number.

4. The stereoscopic video display apparatus according to claim 3, wherein in the drive module:
 a first subpixel included in a pixel on an odd-numbered row in the one subframe is used as a first subpixel included in a pixel on an even-numbered row adjacent to the odd-numbered row when a parallax image having a number adjacent to a number of a parallax image displayed by the first subpixel is displayed in the other subframe; and
 a second subpixel included in a pixel on an odd-numbered row in the other subframe is used as a second subpixel included in a pixel on an even-numbered row adjacent to the odd-numbered row when a parallax image having a number adjacent to a number of a parallax image displayed by the second subpixel is displayed in the one subframe.

5. The stereoscopic video display apparatus according to claim 1, wherein the third subpixel is a G subpixel, and one of the first and second subpixels is an R subpixel whereas the other of the first and second subpixels is a B subpixel.

6. The stereoscopic video display apparatus according to claim 1, wherein an inclination angle θ between a direction of extension of the optical apertures and a column direction of subpixels on the display screen is represented by $$\theta = \arctan^{-1}(1/n)$$

where n is a natural number of at least 2.

7. The stereoscopic video display apparatus according to claim 1, wherein the optical plate is a lenticular sheet.

8. The stereoscopic video display apparatus according to claim 1, wherein the optical plate is a slit.

9. A stereoscopic video display method for displaying a stereoscopic video with a plurality of parallax images including a first and second parallax images by using the stereo scopic video display apparatus according to claim 1, the method comprising:

selecting three subpixels which are the first to third subpixels arranged consecutively in the column direction of subpixels with the third subpixel located in the center, as a pixel displaying each parallax image;

assigning first and second pixels which are adjacent in the column direction and display the first parallax image in each elemental image so as to cause a third subpixel from top of the first pixel and a first subpixel from top of the second pixel to be adjacent to each other in a same subpixel row;

assigning third and fourth pixels which are adjacent in the column direction and display the second parallax image in each elemental image so as to be adjacent to the first and second pixels in a row direction respectively;

causing the second pixel in the first parallax image and the third pixel in the second parallax image adjacent to a subpixel column direction of the second pixel to share one subpixel;

dividing each of frames displaying a stereoscopic video into two subframes;

displaying parallax images of a first group from among a plurality of parallax images on one of the two subframes, the parallax images of the first group including the first parallax image; and displaying parallax images of a remaining second group from among the plurality of parallax images on the other of the two subframes, the parallax images of the second group including the second parallax image.

10. A stereoscopic video display apparatus to display a stereoscopic video with a plurality of parallax images including a first and second parallax images, the apparatus comprising:

a display module configured to include a display screen in which first to third subpixels having respectively different color components are arranged in a matrix form;

an optical plate configured to be disposed to be opposed to the display module, the optical plate including a plurality of optical apertures, a direction of extension of the optical apertures being inclined from a column direction of subpixels on the display screen, and light rays from the plane display module being controlled by the optical plate;

a drive module which sends data to the display module, assigns the data to the first to third subpixels in the display module, and drives the display module to display a stereoscopic video, wherein the display module includes a configuration obtained by arranging a first subpixels and the second subpixels alternately on a first subpixel row, arranging the third subpixels on a second subpixel row adjacent to the first subpixel row, arranging the first subpixels and the second subpixels alternately on a third subpixel row adjacent to the second subpixel row to have a sequence opposite to that on the first subpixel row, arranging the third subpixels on a fourth subpixel row adjacent to the third subpixel row, and arranging a set of the first to fourth subpixel rows in the column direction of subpixels on the display screen repeatedly;

the drive module selects three subpixels which are the first to third subpixels arranged consecutively in the column direction of subpixels with the third subpixel located in the center, as a pixel displaying each parallax image;

the drive module assigns first and second pixels which are adjacent in the column direction and display the first parallax image in each elemental image so as to cause a third subpixel from top of the first pixel and a first subpixel from top of the second pixel to be adjacent to each other in a same subpixel row;

the drive module assigns third and fourth pixels which are adjacent in the column direction and display the second parallax image in each elemental image so as to be adjacent to the first and second pixels in a row direction respectively;

the drive module causes the second pixel in the first parallax image and the third pixel in the second parallax image adjacent to a subpixel column direction of the second pixel to share one subpixel; and the drive module divides each of frames displaying a stereoscopic video into two subframes, displays parallax images of a first group from among a plurality of parallax images on one of the two subframes, and displays parallax images of a remaining second group from among the plurality of parallax images on the other of the two subframes, the parallax images of the first group including the first parallax image and the parallax images of the second group including the second parallax image.

* * * * *